(12) United States Patent
Luo et al.

(10) Patent No.: US 12,181,599 B2
(45) Date of Patent: Dec. 31, 2024

(54) ENHANCED 911 LOCATION FOR DENSE CELL NETWORK MESHES

(71) Applicant: AT&T Intellectual Property I, L.P., Atlanta, GA (US)

(72) Inventors: Minsky Luo, Watchung, NJ (US); David Kinsey, Carnation, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 400 days.

(21) Appl. No.: 17/650,005

(22) Filed: Feb. 4, 2022

(65) Prior Publication Data

US 2023/0251344 A1 Aug. 10, 2023

(51) Int. Cl.
*G01S 5/02* (2010.01)
*H04W 4/029* (2018.01)
*H04W 4/90* (2018.01)

(52) U.S. Cl.
CPC ........... *G01S 5/0268* (2013.01); *H04W 4/029* (2018.02); *H04W 4/90* (2018.02)

(58) Field of Classification Search
CPC ........ G01S 5/0268; G01S 5/14; G01S 5/0295; H04W 4/029; H04W 4/90; H04W 4/02; H04W 64/00
See application file for complete search history.

(56) References Cited

U.S. PATENT DOCUMENTS

| 11,057,791 B2 | 7/2021 | Majmundar et al. |
| 2007/0132639 A1* | 6/2007 | Korneluk .............. G01S 19/252 342/464 |
| 2013/0337767 A1* | 12/2013 | Siomina ................ G01S 5/0289 455/404.2 |
| 2021/0329586 A1* | 10/2021 | Opshaug ............... H04W 64/00 |

OTHER PUBLICATIONS

"5G; NR; Base Station (BS) radio transmission and reception (3GPP TS 38.104 version 15.5.0 Release 15)," Technical Specification, ETSI TS 138 104 V15.5.0 (May 2019), 219 pages.
"5G; NR; Overall description; Stage-2 (3GPP TS 38.300 version 15.9.0 Release 15)," Technical Specification, ETSI TS 138 300 V15.9.0 (Apr. 2020), 102 pages.
"3rd Generation Partnership Project; Technical Specification Group Radio Access Network; NR; Study on Integrated Access and Backhaul; (Release 16)," 3GPP TR 38.874 V16.0.0 (Dec. 2018), 111 pages.

(Continued)

*Primary Examiner* — Umair Ahsan

(57) ABSTRACT

Techniques for Enhanced 911 (E911) location for dense cell network meshes are provided. A method can include obtaining, by a system comprising a processor via a communication network comprising first network cells listed in a neighboring cell list of a user equipment, coverage area information for the first network cells, wherein the coverage area information comprises respective reported positions of the first network cells and respective coverage radii of the first network cells; determining, by the system based on the coverage area information for the first network cells, a first area in which respective coverage areas of the first network cells overlap; and defining, by the system, an estimated position of the user equipment as a selected position within the first area.

20 Claims, 12 Drawing Sheets

(56) References Cited

OTHER PUBLICATIONS

"5G NR Cell Search and System Acquisition Procedure," Techplayon, https://www.techplayon.com/5g-nr-cell-search-and-synchronization-acquiring-system-information/, Jul. 28, 2019, 11 pages.
Gebretsadik, "Impact of 5G on Location Accuracy & Lawful Interception," SS8 Networks, Inc., https://media.pipeline.pubspoke.com/files/asset/1395/SS8%205G%20Impact%20on%20Location%20Accuracy%20and%20Lawful%20 Interception%20Whitepaper.pdf, 2020, 16 pages.

* cited by examiner

ENHANCED 911 LOCATION FOR DENSE CELL NETWORK MESHES

TECHNICAL FIELD

The present disclosure relates to wireless communication networks, and, in particular, to techniques for facilitating Enhanced 911 (E911) device location in dense cellular network meshes.

BACKGROUND

Enhanced 911 (E911) is a service that facilitates location of a user equipment (UE) when the UE places an emergency call, e.g., a 911 call, such that a dispatchable location can be provided to Public Safety Answering Points (PSAPs), such as local or county police, fire and rescue departments, etc. When E911 service is used, both location and callback information can be provided.

Additionally, E911 location information can be divided into two categories. Category 1 information includes rough location information based on the location of the cell site hosting the emergency call, and Category 2 information includes more precise data based on the location of the UE that placed the emergency call. The certainty of the location provided via E911 service can be indicated by a confidence factor (COF), which can indicate a radius or other window of uncertainty for the reported UE location.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include obtaining, by a system including a processor via a communication network that includes first network cells that are listed in a neighboring cell list of a user equipment, coverage area information for the first network cells, where the coverage area information includes respective reported positions of the first network cells and respective coverage radii of the first network cells. The method can further include determining, by the system based on the coverage area information for the first network cells, a first area in which respective coverage areas of the first network cells overlap. The method can further include defining, by the system, an estimated position of the user equipment as a selected position within the first area.

In another aspect, a system as described herein can include a processor and a memory that stores first executable instructions that, when executed by the processor, facilitate performance of operations. The operations can include obtaining, via a communication network, information relating to first coverage areas of first network cells, associated with a neighboring cell list of a user equipment, where the first coverage areas are defined by respective positions of the first network cells and respective coverage radii of the first network cells, where the communication network includes the first network cells. The operations can also include determining a first area in which the first coverage areas of the first network cells overlap. The operations can additionally include selecting, as an estimated position of the user equipment, a position within the first area.

In a further aspect, a non-transitory machine-readable medium as described herein can include first executable instructions that, when executed by a processor, facilitate performance of operations. The operations can include determining first coverage areas, of network cells listed in a neighboring cell list of a user equipment, where the first coverage areas are defined by reported positions of the network cells and coverage radii of the network cells; determining an area of overlap between the first coverage areas of the network cells; and defining, as an approximate position of the user equipment, a selected location within the area of overlap.

Figure 1:
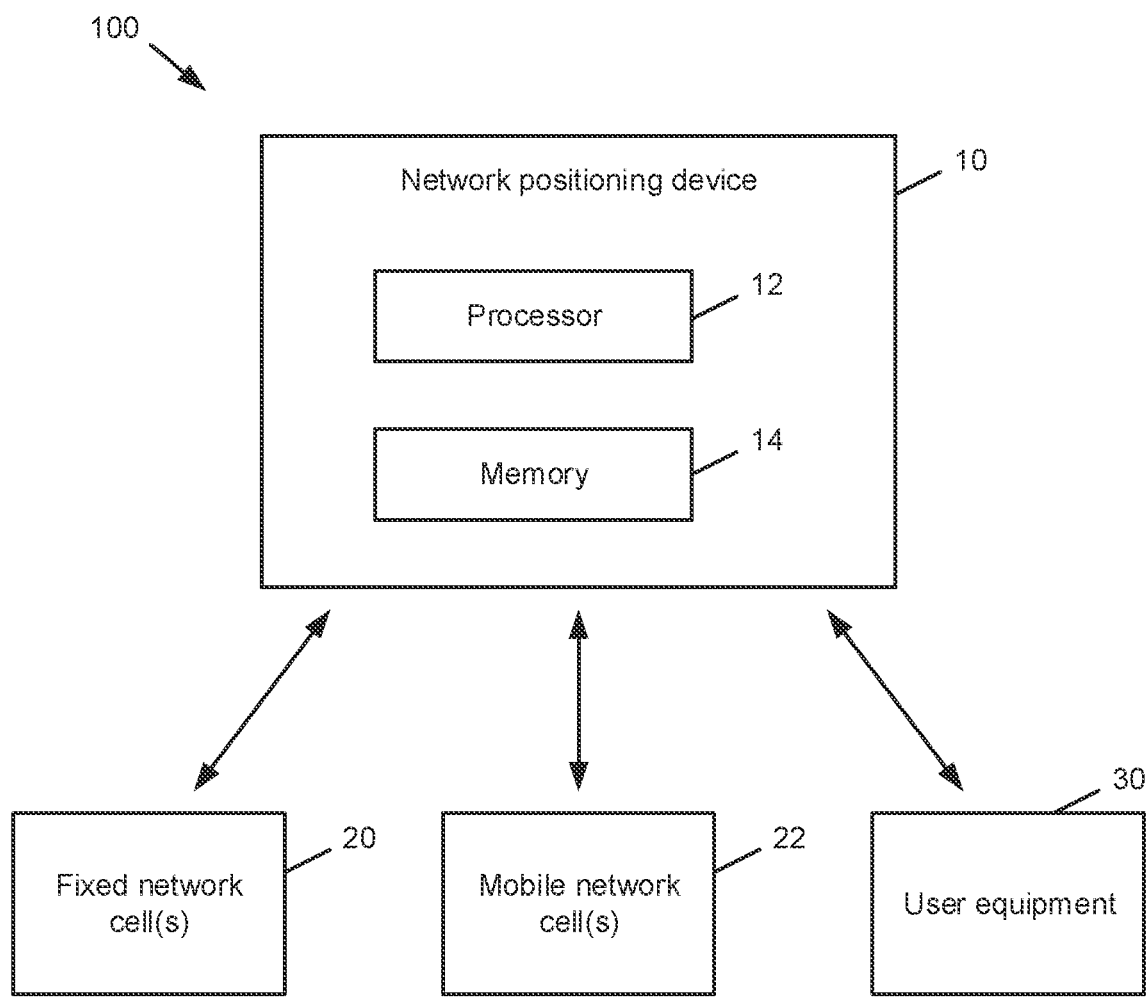
FIG. 1 is a block diagram of a system that facilitates E911 location for dense cell network meshes in accordance with various aspects described herein.

Referring first to FIG. 1, a system 100 that facilitates E911 location for dense cell network meshes is illustrated. System 100 as shown by FIG. 1 includes a network positioning device 10 that can communicate with respective devices of an associated communication network. Here, the network positioning device 10 is associated with a cellular communication network, e.g., a Fourth Generation (4G) Long Term Evolution (LTE) network or a Fifth Generation (5G) New Radio (NR) network, a Next Generation (NG) wireless communication network, or the like. The cellular communication network associated with the network positioning device can include fixed network cells 20 and mobile network cells 22, e.g., network cells capable of movement while operational. It is noted, however, that similar techniques to those described herein for cellular networks could also be used to facilitate positioning for other wireless communication technologies, such as Wi-Fi, BLUETOOTH®, or the like.

As further shown in FIG. 1, the communication network associated with the network positioning device 10 and the network cells 20, 22 can provide communication service for user equipment (UE) 30. Various implementations presented herein are described with respect to UEs 30 that are both mobile and capable of placing emergency calls (e.g., via a 911 system), such as mobile phones, laptop or tablet computers utilizing a voice over internet protocol (VOIP) service, autonomous vehicles or vehicle communication systems, or the like. It is noted, however, that other UE types, such as Internet of Things (IoT) devices, desktop computers, and/or any other type of device that can desirably operate within a communication network, can also be used. While only one UE 30 is shown in FIG. 1 for simplicity of illustration, it is further noted that a wireless communication network, such as the network represented by system 100, can include any suitable number of UEs 30 and/or other devices.

In an aspect, the functionality of the network positioning device 10 as described herein can be implemented via one or more network functions, which in turn can performed by one or more devices of a communication network. Accordingly, the term "network positioning device" as described herein refers to any device and/or combination of devices in a communication network that can determine and/or estimate the position of a UE 30 operating in the network. Some or all of the functionality of the network positioning device 10 as described herein can be implemented via core network equipment and/or radio access network (RAN) equipment (e.g., RAN equipment located at the network edge), such as an Open RAN (O-RAN) RAN Intelligent Controller (RIC) or the like. Other devices are also possible.

In another aspect, the network positioning device 10 can include a processor 12 and a memory 14, which can be utilized to facilitate various functions of the network positioning device 10. For instance, the memory 14 can include a non-transitory computer readable medium that contains computer executable instructions, and the processor 12 can execute instructions stored by the memory 14. For simplicity of explanation, various actions that can be performed via the processor 12 and the memory 14 of the network positioning device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

The network positioning device 10, via the processor 12 and memory 14, can facilitate improved mobile device positioning, e.g., for an E911 system or the like, in the presence of dense or ultra-dense network meshes. For instance, a communication network that provides 5G quality service can have significantly increased cell density, a cell density that is approximately 10 to 100 times greater compared to communication networks associated with earlier technologies such as LTE. Further, 5G networks could potentially employ mobile network cells, i.e., network cells that are not associated with a single fixed point, to fulfill some or all of this additional cell density. Because of the potential introduction of mobile network cells, existing techniques for mobile device positioning that assume cell sites are stationary, such as cell site triangulation, are less suitable for the high-density network mesh environments that will be associated with 5G networks and/or other network technologies in the future.

By implementing various embodiments as described herein, various advantages can be realized that can improve the performance of a wireless communication network and/or respective devices in the network. These advantages can include, but are not limited to, the following. Position location for mobile devices operating in a network can be performed based on mobile as well as stationary network cells, increasing the achievable density and versatility of the underlying network. Network computing and communication resources associated with device positioning, e.g., resources associated with performing and communicating radio measurements, can be reduced or in some cases eliminated. Other advantages are also possible.

Figure 2:
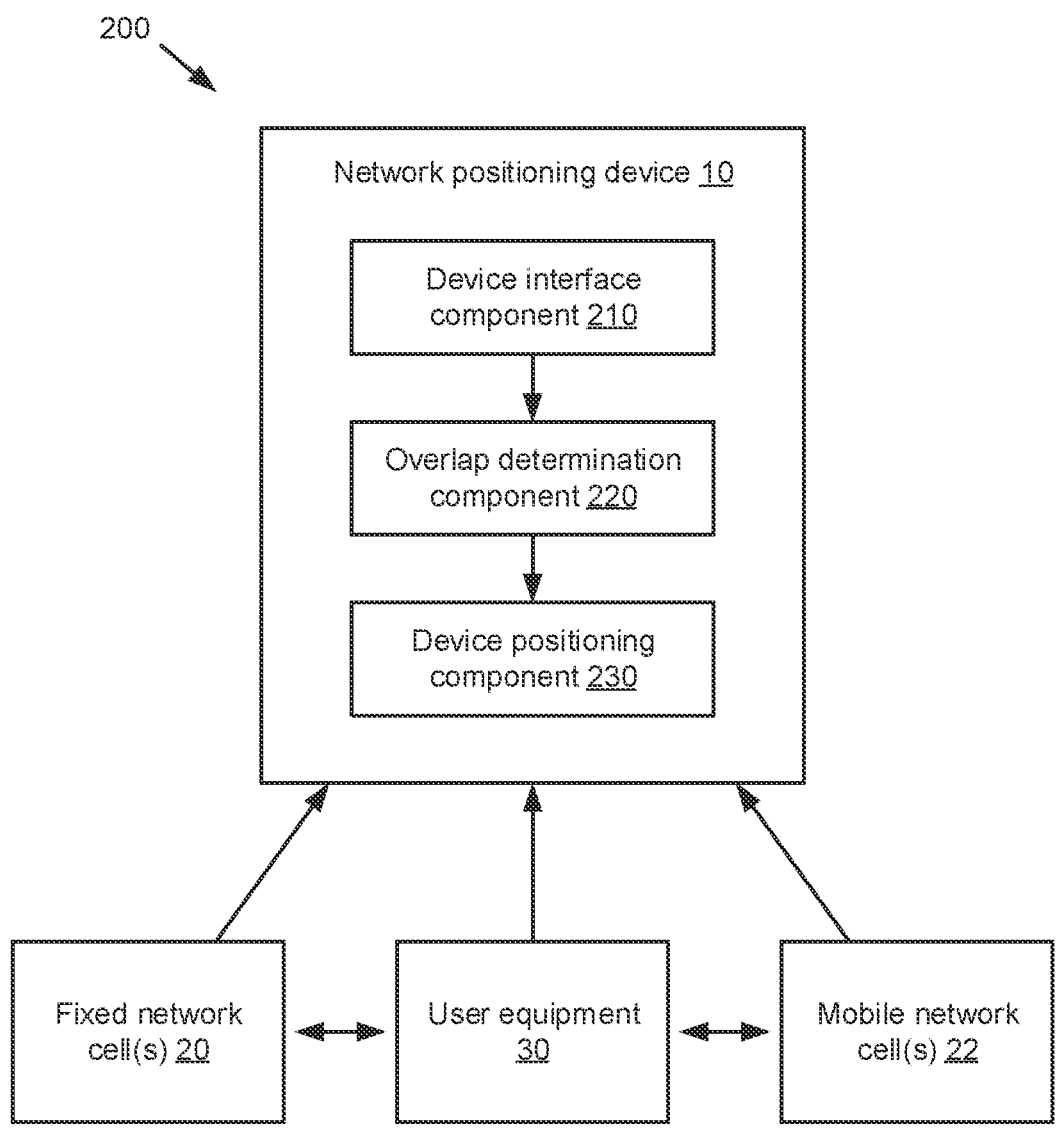
FIG. 2 is a block diagram that depicts the functionality of the network positioning device of FIG. 1 in further detail in accordance with various aspects described herein.

With reference now to FIG. 2, a block diagram of a system 200 that facilitates E911 location for dense cell network meshes is illustrated. Repetitive description of like elements employed in other embodiments described herein is omitted for sake of brevity. System 200 as shown in FIG. 2 includes a network positioning device 10 that can operate in a similar manner to that described above with respect to FIG. 1. As further shown in FIG. 2, the network positioning device 10 includes a device interface component 210 that can receive and/or otherwise obtain coverage area information for network cells that are associated with a neighboring cell list (NCL) maintained by a UE 30. In an aspect, the network cells for which the device interface component 210 obtains coverage area information can include respective fixed network cells 20 and at least one mobile network cell 22. The network positioning device 10 can obtain coverage area information for the cells associated with the NCL of the UE via network equipment of a communication network, e.g., from the network cells 20, 22 themselves and/or one or more other intermediary devices operating in the network.

In an aspect, coverage area information received by the device interface component 210 can define respective coverage areas associated with the network cells 20, 22 in the NCL as maintained by the UE 30 based on properties such as reported positions of the respective network cells 20, 22, coverage radii associated with the respective network cells 20, 22, and/or other suitable properties. Techniques for maintaining location data for respective mobile network cells 22 are described in further detail below with respect to FIGS. 3-4. As used herein, the coverage radius of a cell refers to the distance from a cell at which a signal strength, quality of service metric, or other performance metric of the cell is equal to a threshold. Accordingly, for purposes of the implementations described herein, a network cell can be regarded as having a substantially circular cell boundary having a radius equal to the coverage radius of the cell. Other cell geometries could also be used.

The network positioning device 10 of system 200 further includes an overlap determination component 220, which can determine an area of overlap between respective coverage areas of the network cells 20, 22 associated with the NCL maintained by the UE 30. An area of overlap as determined by the overlap determination component 220 can additionally be based on other factors, such as network cells near the UE 30 that are not in the NCL maintained by the UE 30 (e.g., as described in further detail below with respect to FIG. 6), sectors or other subdivisions of cells associated with the UE 30 (e.g., as described in further detail below with respect to FIG. 7), or the like.

The network positioning device 10 of system 200 additionally includes a device positioning component 230, which can define an estimated position of the UE 30 as a selected position within the area of overlap determined by the overlap determination component 220, e.g., a center or substantially center point within the area of overlap. In doing so, the device positioning component 230 can facilitate locating an approximate position of the UE 30 based on geometric analysis of neighboring cell boundaries without performing or utilizing radio measurements from those cells. This, in turn, can enable an estimated location of the UE 30 to be determined using mobile network cells 22, as measurement-based location techniques are infeasible for mobile network cells 22 due to their lack of a fixed reference position. In addition, geometric positioning as performed by the network positioning device 10 can enable increased location accuracy in urban canyon environments and/or other network environments where a UE 20 lacks line of sight to a sufficient number of cell sites, Global Positioning System (GPS) satellites, and/or other objects to obtain an approximate location of the UE 30 by other means.

Figure 3:
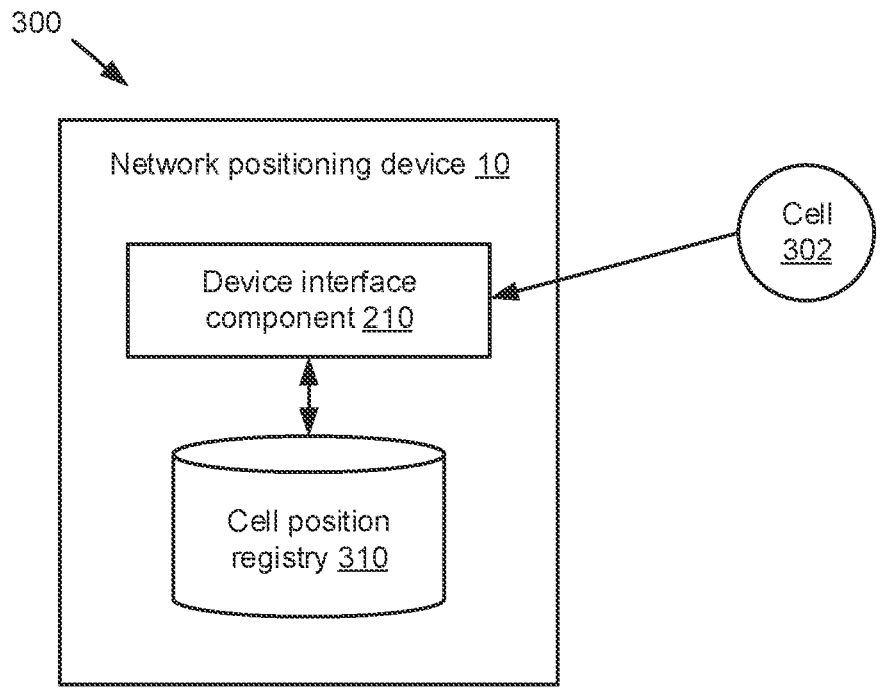
FIGS. 3-4 are respective block diagrams of a system that facilitates location reporting for mobile network cells in accordance with various aspects described herein.
Figure 4:
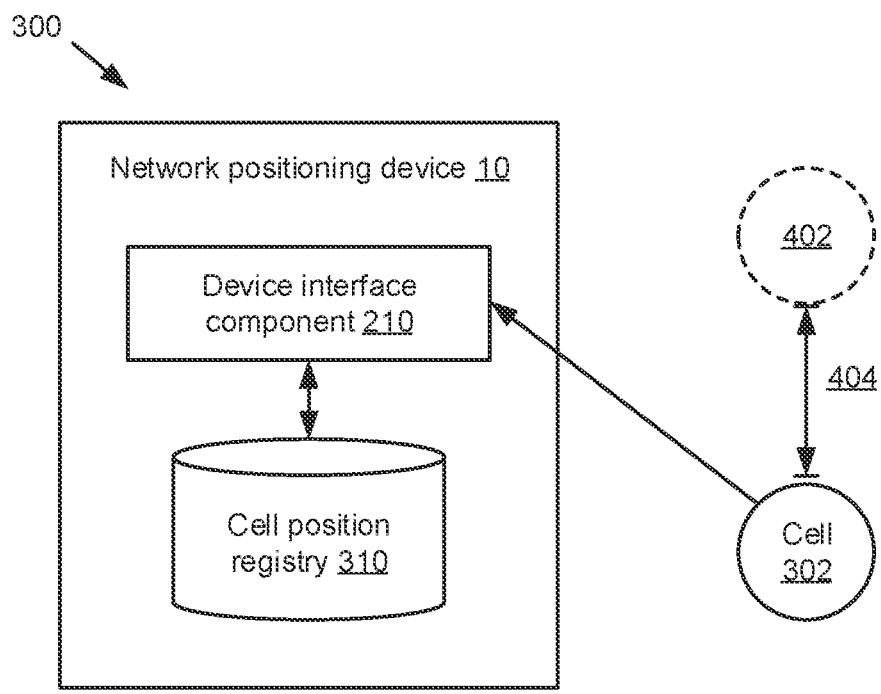

Referring now to FIGS. 3-4, respective block diagrams of a system 300 that facilitates location reporting for mobile network cells are illustrated. Repetitive description of like elements employed in other embodiments described herein is omitted for sake of brevity. With reference first to FIG. 3, the device interface component 210 of the network positioning device 10 can receive information from a network cell 302 that includes the position of the network cell 302, e.g., in terms of GPS coordinates or the like, as well as optional coverage range log and/or other performance data records. Upon receiving position data as reported by the network cell 302, the network positioning device 10 can save the position of the network cell 302 in a cell position registry 310 and/or another suitable data structure.

Referring next to FIG. 4, in the event that the network cell 302 makes a significant displacement, e.g., the network cell 302 moves from its previous position 402 to a new position that is at least a threshold distance 404 from the previous position 402, the network cell 302 can report its new position (e.g., GPS coordinates, etc.) to the network positioning device 10. By way of specific, non-limiting example, a network cell 302 can be configured to update its reported position to the network positioning device 10 whenever it moves at least 30 feet from its previous reported position. Thus, for a network cell 302 moving at a constant rate of 45 mph, the network cell 302 would report its position to the network positioning device approximately every 0.45 seconds. Other examples could also be used.

In response to receiving an updated position for the network cell 302, the network positioning device 10 can save the new position of the network cell 302 in the cell position registry 310, e.g., as described above with respect to FIG. 3. Accordingly, the network positioning device 10 can be configured to use a newly reported position for a given cell, instead of a previously reported position, when performing positioning operations using that cell. In an aspect, the cell position registry 310 can additionally maintain a history of locations for each mobile cell associated with the network positioning device 10 for a time period sufficient to perform and serve position calculations for a given UE, e.g., a time period of up to several minutes.

Figure 5:
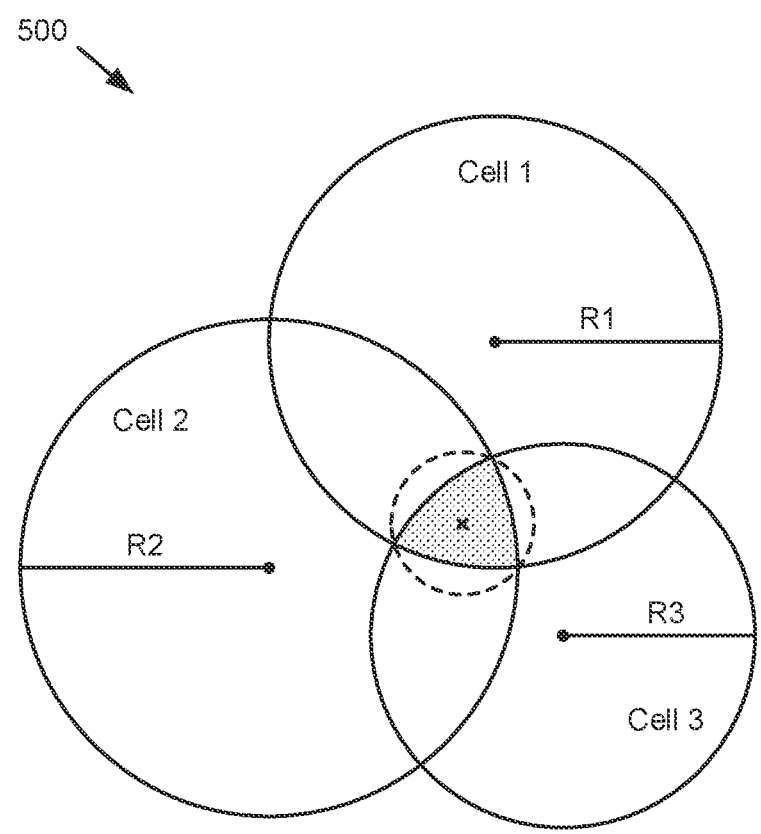
FIGS. 5-7 are diagrams that depict example device location techniques that can be used in accordance with various aspects described herein.

Turning now to FIG. 5, and with further reference to FIG. 2, a diagram 500 that depicts an example device location technique that can be used by the network positioning device 10 is presented. Repetitive description of like elements employed in other embodiments described herein is omitted for sake of brevity. As noted above, the network positioning device 10 can be given information regarding the coverage area of respective cells in an NCL maintained by a UE 30.

As shown in diagram 500, the coverage areas for each cell can be defined by the locations of the respective cells (denoted by dots in diagram 500) and the coverage radii of the cells, here denoted as R1-R3 for cells 1-3, respectively. While each cell shown in diagram 500 has the same coverage radius for simplicity of illustration, it is noted that respective cells could differ in coverage radius and/or other properties. For example, the coverage radius R1-R3 of a given cell could depend on the transmit power used by the cell, the transmission technology used by the cells (e.g., millimeter wave or mm Wave communication, etc.), environment in which the cell operates, and/or other factors. By way of specific, non-limiting examples, small cells used in an urban environment can have a coverage radius of up to approximately 300 feet. Other coverage radii are also possible.

In an aspect, the overlap determination component 220 of the network positioning device 10 can determine the area of overlap of respective cells associated with a UE to be positioned. In diagram 500, the area of overlap is illustrated as a shaded area. Based on the determined area of overlap, the device positioning component 230 can compute an estimated position of the UE as a center point or sub-area within the area of overlap, e.g., as shown by the X in diagram 500. Additionally, the device positioning component 230 can determine an error radius for the estimated position of the UE based on respective distances from the center point of the area of overlap to a perimeter of the area of overlap. In an aspect, the error radius can be set by the device positioning component 230 to the largest distance between the center of the area of overlap and an edge of the area of overlap, e.g., as shown by the dashed line in diagram 500. An example algorithm that can be used to compute an estimated UE position and related error radius are described in further detail below with respect to FIGS. 10-11.

While diagram 500 illustrates an example in which three cells are used, it is noted that similar techniques could be used for any number of cells, including a single cell. In the event that there is only one cell in the NCL of a UE, the device positioning component 230 of the network positioning device 10 could set the estimated position of the UE to the location of the single cell, with an error radius equal to the coverage radius of the cell. However, such a scenario would be rare in a densified cell mesh, e.g., a dense or ultra-dense cell mesh in an urban area or other location. Conversely, for a dense cell mesh in which multiple cells are present in the NCL of a UE, a positioning technique such as that shown by diagram 500 can provide a high degree of accuracy due to the short effective range of small cells.

Because the network positioning device 10 approximates the position of a UE as shown in diagram 500 via geometric analysis, radio measurements, such as those performed for triangulation, are not performed. As a result, the position of a UE can be determined by the network positioning device 10 without involvement from the cells in the NCL of the UE other than position reporting, e.g., as described above with respect to FIGS. 3-4.

Figure 6:
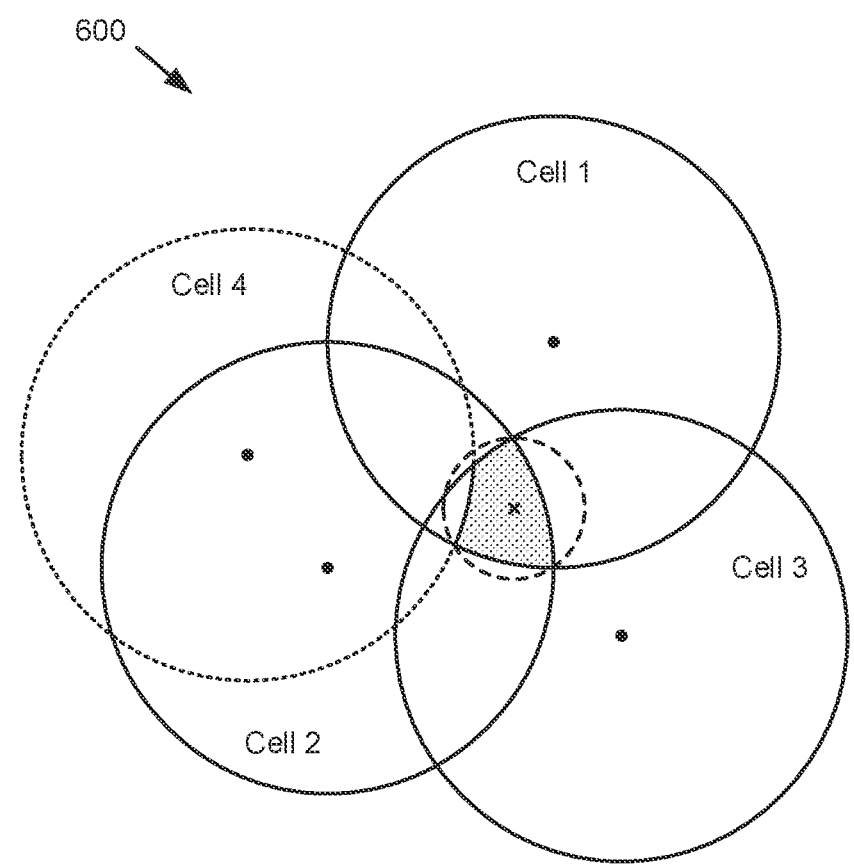

With reference next to FIG. 6, and with further reference to FIG. 2, a diagram 600 that depicts another example device location technique that can be used by the network positioning device 10 is presented. Repetitive description of like elements employed in other embodiments described herein is omitted for sake of brevity. As shown by diagram 600, in addition to coverage area information associated with cells associated with the NCL maintained by a UE 30, e.g., as shown by diagram 500 in FIG. 5, the device interface component 210 of the network positioning device 10 additionally obtains coverage area information for additional network cells, which are not in the NCL of the UE 30 but border or are otherwise positioned near the network cells in the NCL. These cells can include, for example, network cells listed in the Neighbor Relation (NR) table of the serving cell for the UE 30. For brevity, these cells are referred to below as "exclusive" cells, while the cells present in the NCL are referred to as "inclusive" cells. While only one exclusive cell is shown in diagram 600 for simplicity of illustration, it is noted that similar techniques could be used for any number of exclusive cells. Similar to the network cells present in the NCL, the coverage area information for the exclusive cells can include registered or reported cell positions (e.g., as maintained as described above with respect to FIGS. 3-4) and coverage radii.

In an aspect, the overlap determination component 220 of the network positioning device 10 can determine an area of overlap between the coverage areas of the inclusive cells, e.g., as shown in diagram 500. As additionally shown by diagram 600, the overlap determination component 220 can further identify a second area, in which the area of overlap of the inclusive cells overlaps with the coverage area of the exclusive cell. Since the absence of a given cell from the NCL of the UE 30 means that the UE 30 is not within the coverage area of that cell, the overlap determination component 220 can remove or otherwise exclude the area at which the coverage area of the exclusive cell overlaps the common coverage area of the inclusive cells, thus reducing the overall size of the region in which the UE 30 can be located based on its NCL and, in turn, the error radius associated with the estimated UE location.

In another aspect, the network positioning device 10 can obtain information relating to exclusive cells relative to a given UE 30 from the inclusive cells for the UE 30. For instance, each cell shown in diagram 600 can maintain its own NCL that identifies other cells within its coverage area, and the network positioning device 10 can compare the cell NCLs again the NCL maintained by the UE 30 to determine the exclusive cells. Also or alternatively, the network positioning device 10 can identify exclusive cells relative to a given UE 30 based on known cell positions, e.g., cell positions maintained in the cell position registry 310 as described above with respect to FIGS. 3-4, relative to positions of the inclusive cells. Other techniques could also be used.

Figure 7:
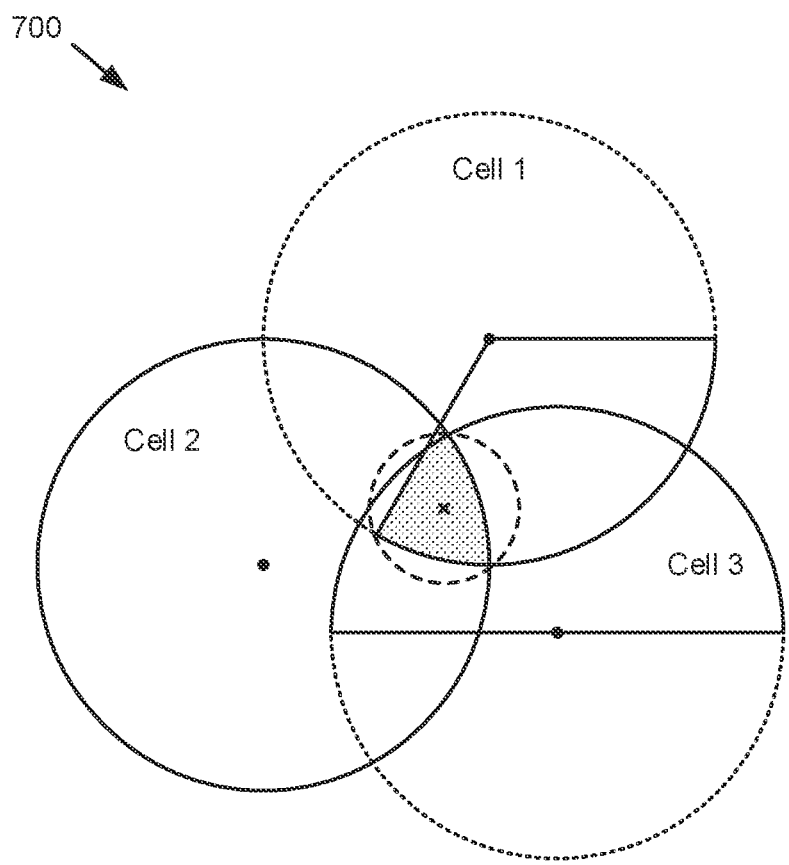

Turning next to FIG. 7, and with further reference to FIG. 2, a diagram 700 that depicts a further example device location technique that can be used by the network positioning device 10 is presented. Repetitive description of like elements employed in other embodiments described herein is omitted for sake of brevity. In contrast to using whole coverage areas as depicted in FIG. 5, diagram 700 shows that the network positioning device 10 can determine sectors of cell coverage areas, or other sub-regions that include less than all of a cell coverage area, in determining a region of overlap.

In one implementation, subsections of cell coverage areas as shown in diagram 700 can be specified by a UE in its NCL, e.g., such that the UE records both observed cells and cell sectors in the NCL. In other implementations, a subsection of a cell coverage area can be determined based on the coverage angle of a given cell. For instance, a network cell situated at a storefront could have a coverage angle of approximately 180 degrees, e.g., due to the cell providing network coverage only inside or outside of the store building. Other techniques for determining a sub-area of a cell coverage area could also be used.

Figure 8:
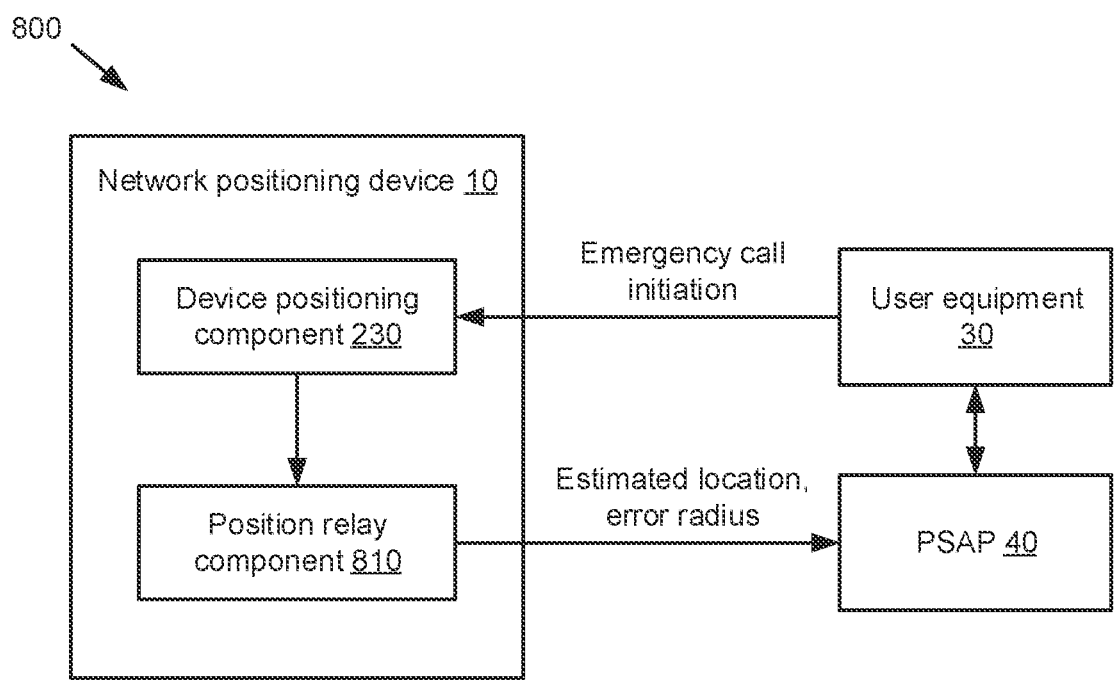
FIG. 8 is a block diagram of a system that facilitates E911 positioning in response to an emergency call being placed in accordance with various aspects described herein.

Referring now to FIG. 8, a block diagram of a system 800 that facilitates cell selection for E911 positioning is illustrated. Repetitive description of like elements employed in other embodiments described herein is omitted for sake of brevity. The network positioning device 10 shown by FIG. 8 includes a position relay component 810 that, in response to a UE 30 initiating an emergency call, can relay the estimated location and error radius associated with the position of the UE 30, e.g., according to various techniques as described above, to network equipment associated with a PSAP 40.

In an aspect, in response to a UE 30 initiating an emergency call, e.g., via a 911 system or another suitable system, the network positioning device 10 can record a timestamp of the emergency call as well as the NCL of the UE 30 at the time of the emergency call. The timestamp information can be used in addition to historical cell position data, e.g., as maintained in a cell position registry 310 as described above with respect to FIGS. 3-4, to estimate the position of the UE 30, e.g., via the device positioning component 230. Subsequently, the position relay component 810 can provide the approximate position of the UE 30 to the PSAP 40, e.g., as an E911 automatic location identifier (ALI). Additionally, the error radius associated with the approximate position of the UE can be utilized to derive a COF to be relayed to the PSAP 40 along with the ALI.

In some embodiments, other information can be provided to the PSAP 50 by the position relay component 810 in addition to, or in place of, an approximate UE position and corresponding error radius. For instance, the position relay component 810 could provide information regarding the boundaries of an area of NCL cell overlap associated with the UE, e.g., as described above with respect to FIG. 5, in order to enhance the precision of position information relayed to the PSAP 40. Other types of information could also be used.

Figure 9:
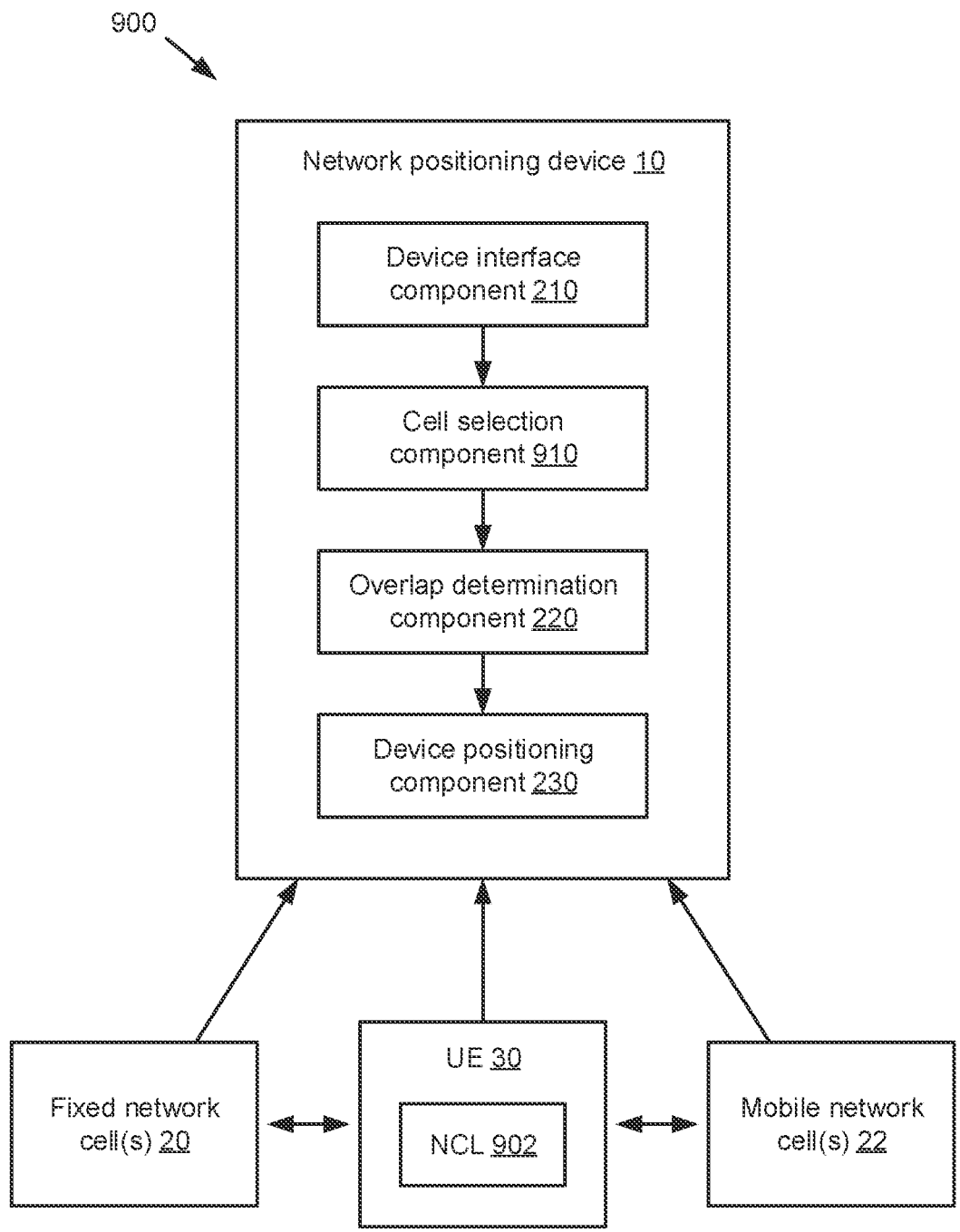
FIG. 9 is a block diagram of a system that facilitates cell selection for E911 positioning in accordance with various aspects described herein.

Turning to FIG. 9, a block diagram of a system 900 that facilitates cell selection for E911 positioning is illustrated. Repetitive description of like elements employed in other embodiments described herein is omitted for sake of brevity. System 900 as shown in FIG. 9 includes a network positioning device 10 that can include a device interface component 210, overlap determination component 220, and device positioning component 230, which can operate as described above with respect to FIG. 2. In addition, the network positioning device of system 900 includes a cell selection component 910 that can select a subgroup of network cells for further processing by the overlap determination component 220.

In an aspect, the cell selection component 910 can receive information related to an NCL 902 associated with a UE 30, and/or information associated with other cells known to the UE 30 (e.g., as provided in a whitelist or blacklist, etc.), and select respective cells for further processing according to various criteria. For instance, the cell selection component 910 can select network cells for further processing that have small coverage radii, e.g., cells listed in the NCL 902 that have coverage radii that are less than a threshold coverage radius, cells listed in the NCL 902 with the smallest N coverage radii for some integer N, etc. Also or alternatively, the cell selection component 910 can select cells listed in the NCL 902 that are known to be active, e.g., due to recently providing a reported location and/or based on other criteria.

Upon selecting respective network cells for further processing, the overlap determination component 220 can be configured to compute an area of overlap for only the selected cells, i.e., without including any non-selected cells. In this way, the cell selection component 910 can serve as an input filter by removing any cells listed in the NCL 902 that are not likely to substantially contribute to the precision of the estimated UE position, thereby reducing the amount of computational complexity associated with the estimated UE position with a negligible impact on precision.

Figure 10:
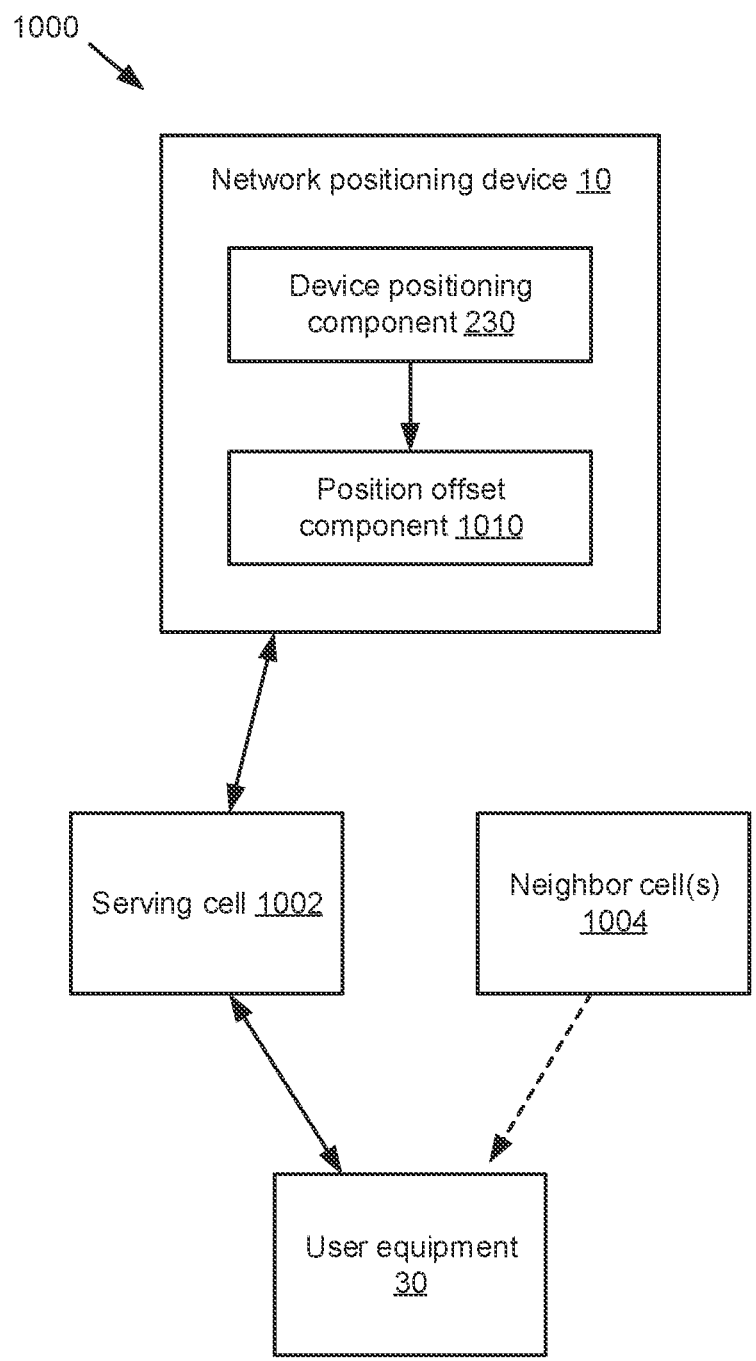
FIG. 10 is a block diagram of a system that facilitates determining the position of a mobile device relative to a serving cell in accordance with various aspects described herein.

Referring next to FIG. 10, a block diagram of a system 1000 that facilitates determining the position of a mobile device relative to a serving cell is illustrated. Repetitive description of like elements employed in other embodiments described herein is omitted for sake of brevity. System 1000 as shown in FIG. 10 includes a UE 30, which can obtain communication service from a serving cell 1002 associated with a communication network. As additionally shown in system 1000, the UE 30 also observes one or more neighbor cells 1004 which are not actively providing communication service to the UE 30.

System 1000 further includes a network positioning device 10, which includes a device positioning component 230 that can approximate a location of the UE 30, e.g., as described above. The network positioning device 10 of system 1000 additionally includes a position offset component 1010, which can define an estimated position of the UE 30, as determined by the device positioning component 230, relative to the serving cell 1002 for the UE 30.

Figure 11:
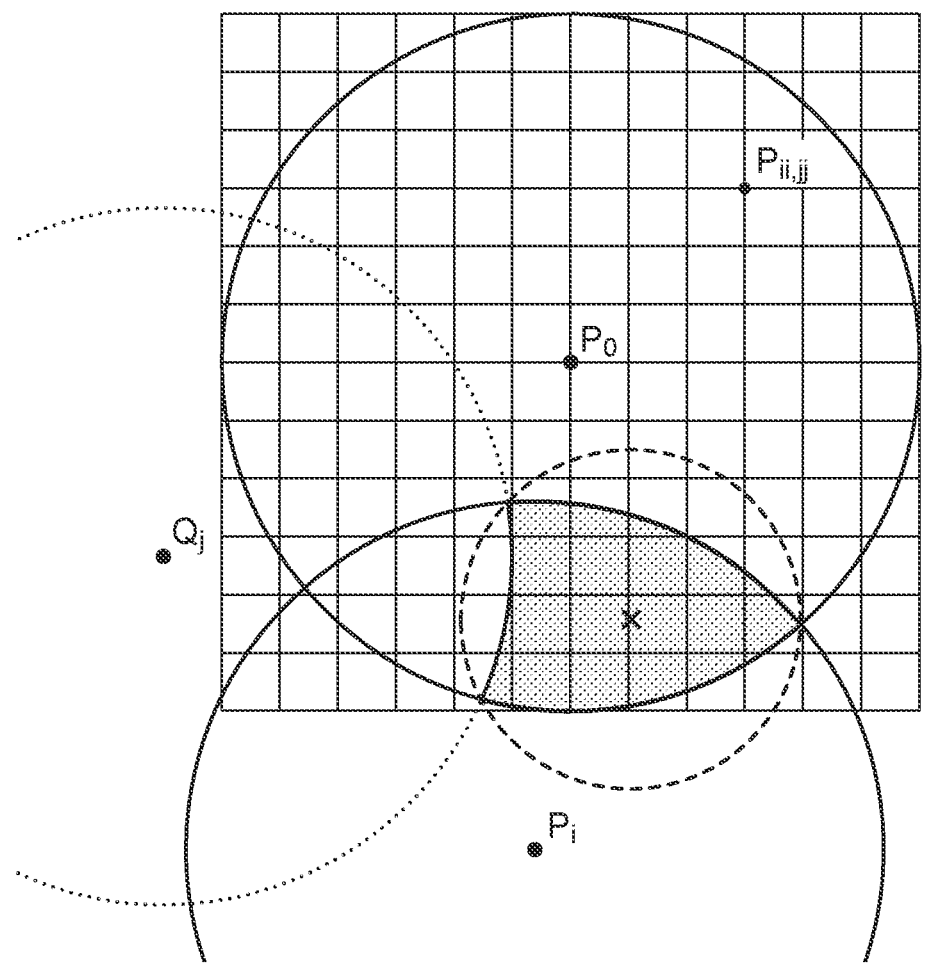
FIG. 11 is a diagram that depicts an additional device location technique that can be used in accordance with various aspects described herein.

An example technique that can be utilized by the network positioning device 10 to estimate the position of a UE 30 relative to its serving cell 1002 is provided in pseudocode format below with reference to diagram 1100 in FIG. 11. It is noted, however, that the following example is merely one technique that could be utilized by the network positioning device 10 and that other techniques could also be used.

As shown in diagram 1100, $P_0$ represents the location of a serving cell for the UE at a given time, e.g., at the time an emergency call is placed. As shown in diagram 1100, location $P_0$, as well as other locations as will be described below, are expressed relative to a grid of a unit length equal to an approximation granularity G (e.g., where G=approximately 10 to 20 feet). Accordingly, location $P_0$ can be expressed as the (x, y) coordinates of the serving cell relative to the grid structure. A sample point on the grid structure is further represented in diagram 1100 as point $P_{ii,jj}$.

As further shown in diagram 1100, locations $P_i$ correspond to the (x, y) coordinates of the neighbor cells of the UE, e.g., the cells listed in an NCL maintained by the UE, and locations $Q_j$ correspond to the (x, y) coordinates of the exclusive cells relative to the UE, e.g., cells that neighbor the serving cell but are not in the NCL of the UE. While only one neighbor cell and one exclusive cell are shown in diagram 1100, the below pseudocode utilizes M neighbor cells, indexed from $P_1$ to $P_M$, and N exclusive cells, indexed from $Q_1$ to $Q_N$. Additionally, the coverage radii of serving cells $P_i$ are defined as $RP_i$, where i corresponds to the neighbor cell index. Similarly, the coverage radius of serving cell $P_0$ is defined as $RP_0$, and the coverage radii of exclusive cells $Q_j$ are defined as $RQ_j$, where j corresponds to the exclusive cell index.

Based on the above definitions, the set of grid points inside the coverage area of the serving cell that are also within the area of overlap between the coverage areas of the neighbor cells at locations $P_i$, excluding those points that are additionally inside the coverage areas of the exclusive cells at locations $Q_j$, is determined according to the pseudocode in Table 1 below. In the example shown by Table 1, S is the number of steps from location of the serving cell to the edge of its range, e.g., S=ceiling ($RP_0$/G), and the function IsInside(ii,jj) is a Boolean function that determines whether point (ii,jj) is inside the area of overlap.

TABLE 1

Example pseudocode for determining area of overlap.

```
For ii = -s..s, jj = -s..s {
  pp = P0 + G* (ii, jj)
  IsInside (ii,jj) = Yes
  For i = 1..M {
    If distance (pp, Pi) > RPi then IsInside (ii,jj) = No
  }
  For j = 1..N {
    If distance (pp, Qj) < RQj then IsInside (ii,jj) = No
  }
}
```

Based on the above, the UE location can be computed as the center of the inside points, as shown in Table 2 below.

TABLE 2

Example pseudocode for determining UE location.

```
Center = (0,0)
Count = 0
For ii = -s..s, jj = -s..s {
  If IsInside (ii,jj) {
    Center = Center + (ii,jj)
    Count = Count + 1
  }
}
Center = Center/Count
UE_Location = P0 + G*Center
```

Additionally, the error range for the UE location can be determined based on the radius of the inside points, as shown in Table 3 below.

TABLE 3

Example pseudocode for determining location error radius.

```
rMax = 0
For ii = -s..s, jj = -s..s {
  rr = distance (Center, (ii,jj))
  If (IsInside (ii, jj) AND rr > rMax) then rMax = rr
}
ErrorRange = G*rMax
```

Figure 12:
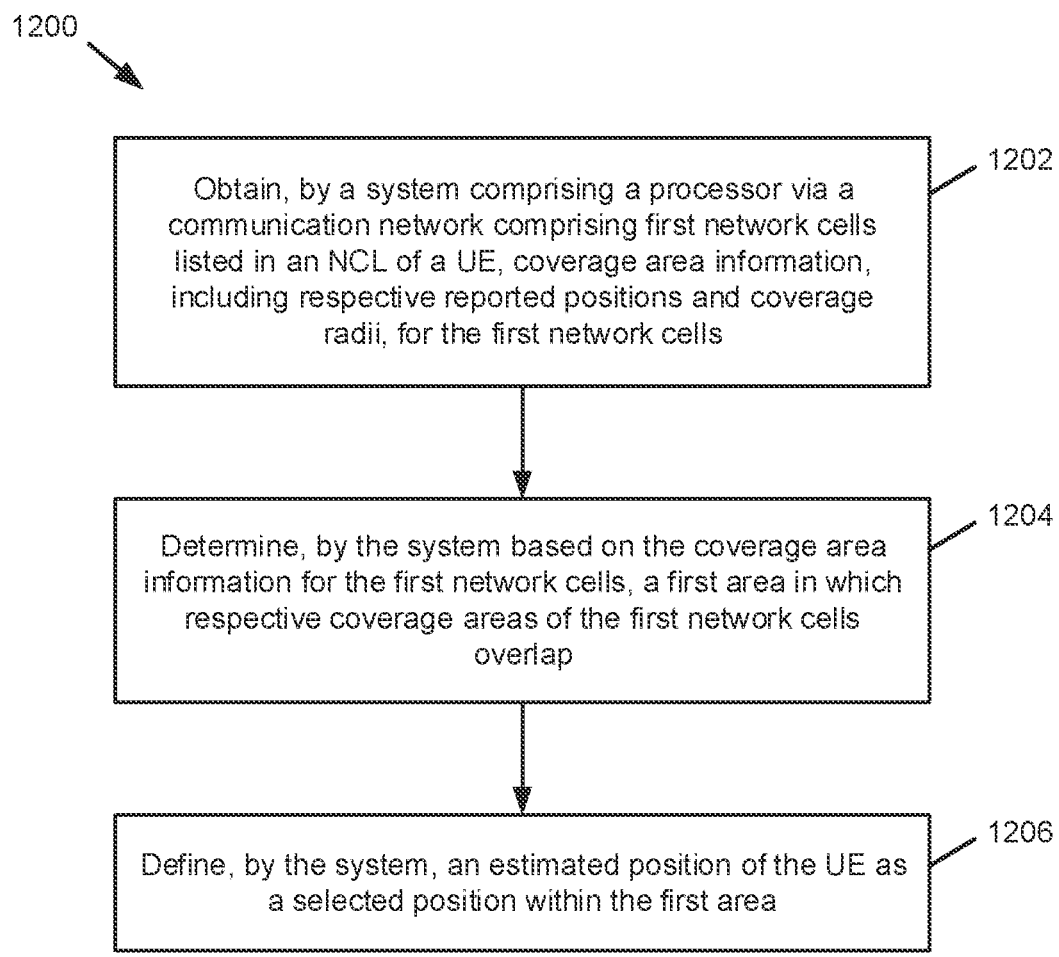
FIG. 12 is a flow diagram of a method that facilitates E911 location for dense cell network meshes in accordance with various aspects described herein.

With reference now to FIG. 12, a flow diagram of a method 1200 that facilitates E911 location for dense cell network meshes is presented. At 1202, a system comprising a processor (e.g., a network positioning device 10 comprising a processor 12, and/or a system including such a device) can obtain (e.g., by a device interface component 210 and/or other components implemented by the processor 12), via a communication network that includes first network cells listed in an NCL of a UE (e.g., a UE 30), coverage area information for the first network cells. Here, the coverage area information includes respective reported positions of the first network cells and coverage radii of the first network cells.

At 1204, the system can determine (e.g., by an overlap determination component 220 and/or other components implemented by the processor 12), based on the coverage area information obtained at 1202, a first area in which respective coverage areas of the first network cells overlap.

At 1206, the system can define (e.g., by a device positioning component 230 and/or other components implemented by the processor 12) an estimated position of the UE as a selected position (e.g., a center position) within the first area determined at 1204.

FIG. 12 illustrates a method in accordance with certain aspects of this disclosure. While, for purposes of simplicity of explanation, the method is shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 13:
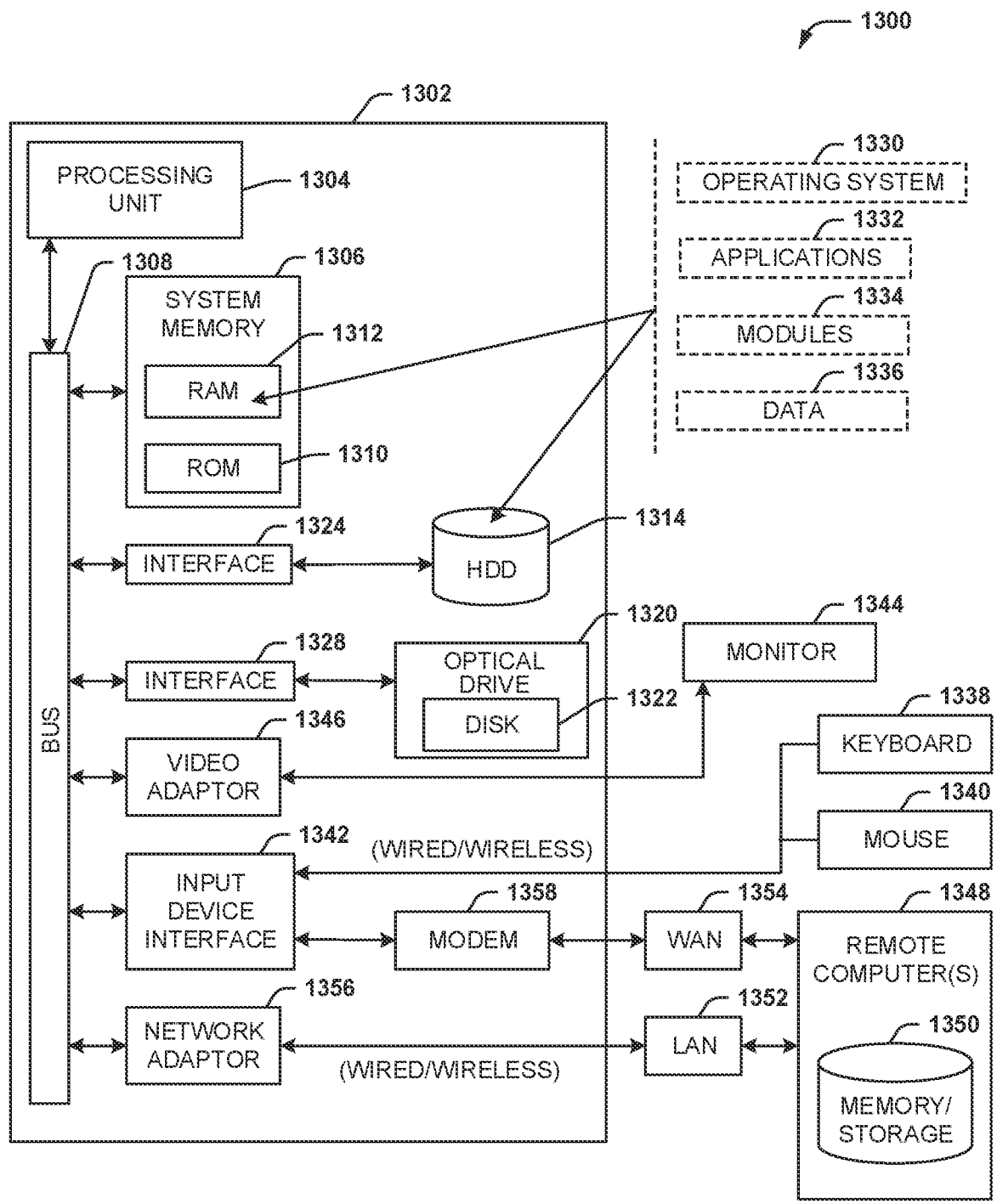
FIG. 13 depicts an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 and an optical disk drive 1320, (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314 and optical disk drive 1320 can be connected to the system bus 1308 by an HDD interface 1324 and an optical drive interface 1328, respectively. The HDD interface 1324 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a USB port, an IR interface, a BLUETOOTH® interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   obtaining, by a system comprising a processor via a communication network comprising first network cells listed in a neighboring cell list of a user equipment, coverage area information for the first network cells, wherein the coverage area information comprises respective reported positions of the first network cells and respective coverage radii of the first network cells, wherein the first network cells comprise a mobile network cell, and wherein the obtaining the coverage area information comprises obtaining a first reported position of the mobile network cell;
   determining, by the system based on the coverage area information for the first network cells, a first area in which respective coverage areas of the first network cells overlap;
   defining, by the system, an estimated position of the user equipment as a selected position within the first area; and
   receiving, by the system from the mobile network cell, a second reported position of the mobile network cell in response to the mobile network cell having moved at least a threshold distance from the first reported position, wherein the determining the first area comprises determining the first area based on the second reported position of the mobile network cell, instead of the first reported position.

2. The method of claim 1, wherein the selected position within the first area is a center point, or a sub-area, of the first area.

3. The method of claim 2, further comprising:
   determining, by the system, an error radius for the estimated position of the user equipment based on respective distances from the center point of the first area to a perimeter of the first area.

4. The method of claim 3, wherein the determining of the first area comprises determining the first area in response to the user equipment having initiated an emergency call, and wherein the method further comprises:
   transmitting, by the system, the estimated position of the user equipment and the error radius to a public safety answering point.

5. The method of claim 1, wherein the respective coverage areas of the first network cells are first coverage areas, and wherein the method further comprises:
   determining a sector of a second network cell observed by the user equipment, the sector of the second network cell comprising less than all of a second coverage area of the second network cell, wherein the determining of the first area comprises determining the first area as an area in which the first coverage areas of the first network cells overlap with the sector of the second network cell, and wherein the second network cell is one of the first network cells or not one of the first network cells.

6. The method of claim 1, wherein the coverage area information is first coverage area information comprising respective first reported positions of the first network cells and respective first coverage radii of the first network cells, and wherein the method further comprises:
   obtaining, by the system, second coverage area information for second network cells, bordering the first network cells and not listed in the neighboring cell list of the user equipment, wherein the second coverage area information comprises respective second reported positions of the second network cells and respective second coverage radii of the second network cells.

7. The method of claim 6, wherein the respective coverage areas of the first network cells are first coverage areas, and wherein the determining of the first area comprises:
   determining, by the system based on the second coverage area information for the second network cells, a second area in which the first area overlaps with a second coverage area of a second network cell, of the second network cells; and
   excluding, by the system, the second area from the first area.

8. The method of claim 1, further comprising:
   obtaining, by the system, a position of a serving network cell associated with the user equipment, wherein the defining of the estimated position of the user equipment comprises defining the estimated position of the user equipment relative to the position of the serving network cell.

9. A system, comprising:
   a processor; and
   a memory that stores executable instructions that, when executed by the processor, facilitate performance of operations, the operations comprising:
      obtaining, via a communication network, information relating to first coverage areas of first network cells, associated with a neighboring cell list of a user equipment, wherein the first coverage areas are defined by respective positions of the first network cells and respective coverage radii of the first network cells, wherein the communication network comprises the first network cells, wherein the first network cells comprise a mobile network cell, and wherein the obtaining the information relating to the first coverage areas comprises receiving, from the mobile network cell, a first position of the mobile network cell;
      determining a first area in which the first coverage areas of the first network cells overlap;
      selecting, as an estimated position of the user equipment, a position within the first area; and receiving, from the mobile network cell, a second position of the mobile network cell in response to the mobile network cell being determined to have moved at least a threshold distance from the first position, wherein the determining the first area comprises determining the first area based on the second position of the mobile network cell, instead of the first position of the mobile network cell.

10. The system of claim 9, wherein the position within the first area is a center point of the first area, and wherein the operations further comprise:
   determining an error radius associated with the estimated position of the user equipment based on respective distances from the center point of the first area to a perimeter of the first area.

11. The system of claim 10, wherein the determining the first area comprises determining the first area in response to the user equipment having initiated an emergency call, and wherein the operations further comprise:
   transmitting the estimated position of the user equipment and the error radius to a public safety answering point.

12. The system of claim 9, wherein the information is first information, wherein the respective positions of the first network cells are first reported positions, wherein the respective coverage radii of the first network cells are first coverage radii, and wherein the operations further comprise:
   obtaining second information relating to second coverage areas of second network cells, bordering the first network cells and not associated with the neighboring cell list of the user equipment, wherein the second coverage areas are defined by respective second reported positions of the second network cells and respective second coverage radii of the second network cells.

13. The system of claim 12, wherein the determining the first area comprises:
   determining a second area in which the first area overlaps with a second coverage area of a second network cell, of the second network cells; and
   removing the second area from the first area.

14. The system of claim 9, wherein the position within the first area is a center point of the first area or a sub-area of the first area.

15. The system of claim 9, wherein the operations further comprise:
   determining a sector of a second network cell observed by the user equipment, the sector of the second network cell comprising less than all of a second coverage area of the second network cell, wherein the determining the first area comprises determining the first area as an area in which the first coverage areas of the first network cells overlap with the sector of the second network cell, and wherein the second network cell is one of the first network cells or not one of the first network cells.

16. A non-transitory machine-readable medium, comprising executable instructions that, when executed by a processor, facilitate performance of operations, the operations comprising:
   determining first coverage areas, of network cells listed in a neighboring cell list of a user equipment, wherein the first coverage areas are defined by reported positions of the network cells and coverage radii of the network cells, and wherein the network cells comprise a mobile network cell;
   determining an area of overlap between the first coverage areas of the network cells;
   defining, as an approximate position of the user equipment, a selected location within the area of overlap;
   receiving, from the mobile network cell, a first reported position of the mobile network cell; and
   receiving, from the mobile network cell, a second reported position of the mobile network cell in response to the mobile network cell moving a threshold distance away from the first reported position, wherein the determining the area of overlap comprises determining the area of overlap using the second reported position of the mobile network cell, instead of the first reported position.

17. The non-transitory machine-readable medium of claim 16, wherein the selected location is a center sub-area of the area of overlap, and wherein the operations further comprise:
   determining an error radius associated with the approximate position of the user equipment based on respective distances from the center sub-area of the area of overlap to a perimeter of the area of overlap.

18. The non-transitory machine-readable medium of claim 17, wherein the determining the area of overlap comprises determining the area of overlap in response to the user equipment having initiated an emergency call, and wherein the operations further comprise:
   transmitting the approximate position of the user equipment and the error radius to a public safety answering point.

19. The non-transitory machine-readable medium of claim 16, wherein the selected position within the area of overlap is a center point of the area of overlap or a sub-area of the area of overlap.

20. The non-transitory machine-readable medium of claim 16, wherein the operations further comprise:
   determining a sector of a second network cell observed by the user equipment, the sector of the second network cell comprising less than all of a second coverage area of the second network cell, wherein the determining the area of overlap comprises determining the area of overlap as an area in which the first coverage areas of the network cells overlap with the sector of the second network cell, and wherein the second network cell is one of the network cells or not one of the network cells.

* * * * *